(12) United States Patent
Lee

(10) Patent No.: US 7,640,011 B2
(45) Date of Patent: Dec. 29, 2009

(54) SYSTEM AND METHOD FOR PROVIDING E-MAIL ADDRESS INFORMATION USING MOBILE PHONE NUMBER

(75) Inventor: Kwang Min Lee, Gyeonggi-Do (KR)

(73) Assignee: Yong-Gu Lee, Goyang-Si, Gyeonggi-Do (KR)

( * ) Notice: Subject to any disclaimer, the term of this patent is extended or adjusted under 35 U.S.C. 154(b) by 267 days.

(21) Appl. No.: 11/328,971

(22) Filed: Jan. 10, 2006

(65) Prior Publication Data
US 2006/0136561 A1    Jun. 22, 2006

Related U.S. Application Data

(63) Continuation of application No. PCT/KR2004/002452, filed on Sep. 23, 2004.

(51) Int. Cl.
*H04M 3/00* (2006.01)

(52) U.S. Cl. .............. 455/418; 455/435.1; 455/414.1; 709/206; 707/10

(58) Field of Classification Search ............. 455/418, 455/435.1, 414.1; 709/206, 245; 707/10
See application file for complete search history.

(56) References Cited

U.S. PATENT DOCUMENTS 6,981,023 B1 * 12/2005 Hamilton et al. ............ 709/206
2002/0188690 A1 * 12/2002 Lee ............................. 709/206
2003/0050984 A1 *  3/2003 Pickup et al. ............... 709/206
2005/0010573 A1 *  1/2005 Garg ........................... 707/10

FOREIGN PATENT DOCUMENTS

| JP | 10-042118  | 2/1998  |
| JP | 2000-253046 | 9/2000 |
| KR | 2000-1965  | 1/2000  |
| KR | 2002-69879 | 9/2002  |
| KR | 2002-83975 | 11/2002 |

* cited by examiner

*Primary Examiner*—Danh C Le
(74) *Attorney, Agent, or Firm*—Cha & Reiter, LLC

(57) ABSTRACT

A system and method for providing e-mail address information using a mobile phone number are provided. The system includes an e-mail address information providing module that stores e-mail address mapping information for variably mapping e-mail address information including one or more e-mail addresses of each of members, who are registered in an e-mail address information providing service that provides specified e-mail address information to be mapped to a mobile phone number, to a mobile phone number of each member, recognizes a member corresponding to a mobile phone number which is received via a communication network with a request for e-mail address information, and acquires and provides specified e-mail address information to be mapped to the received mobile phone number based on the member's e-mail address mapping information; and an e-mail address converting module that converts the mobile phone number into the specified e-mail address information.

16 Claims, 13 Drawing Sheets

| MEMBER IDENTIFICATION INFORMATION | | E-MAIL ADDRESS INFORMATION | E-MAIL ADDRESS MAPPING INFORMATIN |
|---|---|---|---|
| MEMBER ID | MOBILE PHONE NUMBER | | |
| MEMBER #1 | 01*-*-** | ***@A.com/ | A.com/B.com |
| | | *-*@hanmail.net/ | hanmail.net |
| | | ***77@hotmail.com/ | OTHERS |
| MEMBER #2 | 01*-*- | -**-*@hanmail.net/ | hanmail.net |
| | | -**@D.com/ | EVERY MAILACCOUNT |
| ⋮ | ⋮ | ⋮ | ⋮ |

| MEMBER LOG DB (113) |
|---|
| E-MAIL SENDER INFORMATION (1131) |
| E-MAIL RECIPIENT INFORMATION (1132) |
| E-MAIL INFORMATION (1133) |

FIG.3A

| MEMBER IDENTIFICATION INFORMATION | | E-MAIL ADDRESS INFORMATION | E-MAIL ADDRESS MAPPING INFORMATIN |
|---|---|---|---|
| MEMBER ID | MOBILE PHONE NUMBER | | |
| MEMBER #1 | 01*-*-** | ***@A.com/ | A.com/B.com |
| | | *-*@hanmail.net/ | hanmail.net |
| | | ***77@hotmail.com/ | OTHERS |
| MEMBER #2 | 01*-*- | -**-*@hanmail.net/ | hanmail.net |
| | | -**@D.com/ | EVERY MAILACCOUNT |
| ⋮ | ⋮ | ⋮ | ⋮ |

FIG.3B

| MEMBER LOG DB (113) |
|---|
| E-MAIL SENDER INFORMATION (1131) |
| E-MAIL RECIPIENT INFORMATION (1132) |
| E-MAIL INFORMATION (1133) |

FIG.4

| | SENDER'S E-MAIL ADDRESS | MOBILE PHONE NUMBER | SENDER'S NAME | SENT TIME | RECEIVED TIME | SUBJECT | OTHERS |
|---|---|---|---|---|---|---|---|
| ☐ | hong@hotmail.com | 011-111-2222 | HONG SOMETHING | 07:09:11 | 07:09:11 | HOW ARE YOU | TEXT |
| ☐ | hong@hotmail.com | 019-222-5522 | HONG GIL DONG | 07:09:18 | 07:09:18 | HOW ARE YOU | TEXT |
| ☐ | hong@hotmail.com | 017-111-2322 | HONG DANG MOO | 07:10:11 | 07:10:11 | HOW ARE YOU | TEXT |
| ☐ | hong@hotmail.com | 018-111-2243 | HONG DANG GEUN | 08:09:11 | 08:09:11 | HOW ARE YOU | TEXT |
| ☑ | hong@hotmail.com | 018-131-2242 | HONG BAD GUY | 09:09:11 | 09:09:11 | HOW ARE YOU | TEXT |
| ☐ | hong@hotmail.com | 016-114-2342 | SPINACH | 11:09:11 | 11:09:11 | HOW ARE YOU | TEXT |
| ☐ | hong@hotmail.com | 017-321-2222 | RADISH | 13:09:11 | 13:09:11 | HOW ARE YOU | TEXT |
| ☐ | hong@hotmail.com | 011-178-2222 | DRAGONFLY | 17:09:11 | 17:09:11 | HOW ARE YOU | TEXT |
| ☐ | hong@hotmail.com | 019-1234-2342 | PUSHISHI | 18:09:11 | 18:09:11 | HOW ARE YOU | TEXT |
| ☐ | hong@hotmail.com | 019-581-9632 | BUJARI | 20:09:11 | 20:09:11 | HOW ARE YOU | TEXT |

SYSTEM AND METHOD FOR PROVIDING E-MAIL ADDRESS INFORMATION USING MOBILE PHONE NUMBER

The present application is a Continuation of international application PCT/KR2004/002452 filed on Sep. 23, 2004.

TECHNICAL FIELD

The present invention relates to a system and method for providing e-mail address information using a mobile phone number, and more particularly, to a system and method for providing a recipient's e-mail address information which is mapped to the recipient's mobile phone number so that a sender can send e-mail using only the recipient's mobile phone number without the recipient's e-mail address.

BACKGROUND ART

With the development of Internet, e-mail has been widely used. As e-mail service is used as a new means of communication instead of an existing postal service, some Internet portal sites provide free mail accounts. Almost of all e-mail users are provided with at least one e-mail account (or e-mail address) by such Internet portal sites and use e-mail for various purposes.

Since many e-mail users have at least one e-mail address, a sender needs to know at least one e-mail address of a recipient among a plurality of e-mail addresses possessed by the recipient and needs to know a new address when the recipient's address is changed. In other words, all of e-mail users are bothered by needing to know an e-mail address of a recipient in advance to send a message to the recipient.

Accordingly, new service allowing an e-mail user (i.e., an e-mail sender) to send message to a recipient by e-mail even if the e-mail sender does not know the recipient's e-mail address is desired.

DISCLOSURE OF THE INVENTION

The present invention provides a system and method for providing recipient's e-mail address information corresponding to the recipient's mobile phone number so that a sender can send a message to the recipient using the recipient's mobile phone number even if the sender does not know the recipient's e-mail address.

According to an aspect of the present invention, there is provided a system for providing e-mail address information using a mobile phone number, including an e-mail address information providing module that stores e-mail address mapping information for variably mapping e-mail address information including one or more e-mail addresses of each of members, who are registered in an e-mail address information providing service that provides specified e-mail address information to be mapped to a mobile phone number, to a mobile phone number of each member, recognizes a member corresponding to a mobile phone number which is received via a communication network with a request for e-mail address information, and acquires and provides specified e-mail address information to be mapped to the received mobile phone number based on the member's e-mail address mapping information; and an e-mail address converting module that stores e-mail address information of each of multiple recipients and e-mail address search area information regarding each recipient, which are input by a member registered in the e-mail address information providing service to request creation of an address book, acquires specified e-mail address information to be mapped to a mobile phone number input as recipient information by the member creating e-mail based on a search area corresponding to the e-mail address search area information regarding a recipient corresponding to the mobile phone number, and converts the mobile phone number into the specified e-mail address information.

According to an aspect of the present invention, there is provided a method of providing e-mail address information using a mobile phone number, including (a) storing/managing e-mail address information including at least one e-mail address of each of members registered in an e-mail address information providing service and e-mail address mapping information regarding each member, using an e-mail address information providing module; (b) extracting address book information regarding a recipient based on the information regarding each of multiple recipients, which is input by a member to request creation of an address book, and storing/managing the address book information, using an e-mail address converting module; (c) when the member creating e-mail inputs a mobile phone number as recipient information, acquiring specified e-mail address information regarding the recipient, which is mapped to the mobile phone number, through interlock between the e-mail address converting module and the e-mail address information providing module via a communication network; (d) converting the mobile phone number into the specified e-mail address information that is acquired in (c), using the e-mail address converting module.

BRIEF DESCRIPTION OF THE DRAWINGS

FIGS. 3A and 3B illustrate databases (DBs) managed by an e-mail address information providing module according to an embodiment of the present invention.

FIG. 4 illustrates received e-mail details provided by an e-mail address information providing module according to an embodiment of the present invention.

BEST MODE FOR CARRYING OUT THE INVENTION

Hereinafter, preferred embodiments of the present invention will be described in detail with reference to the attached drawings.

Figure 1:
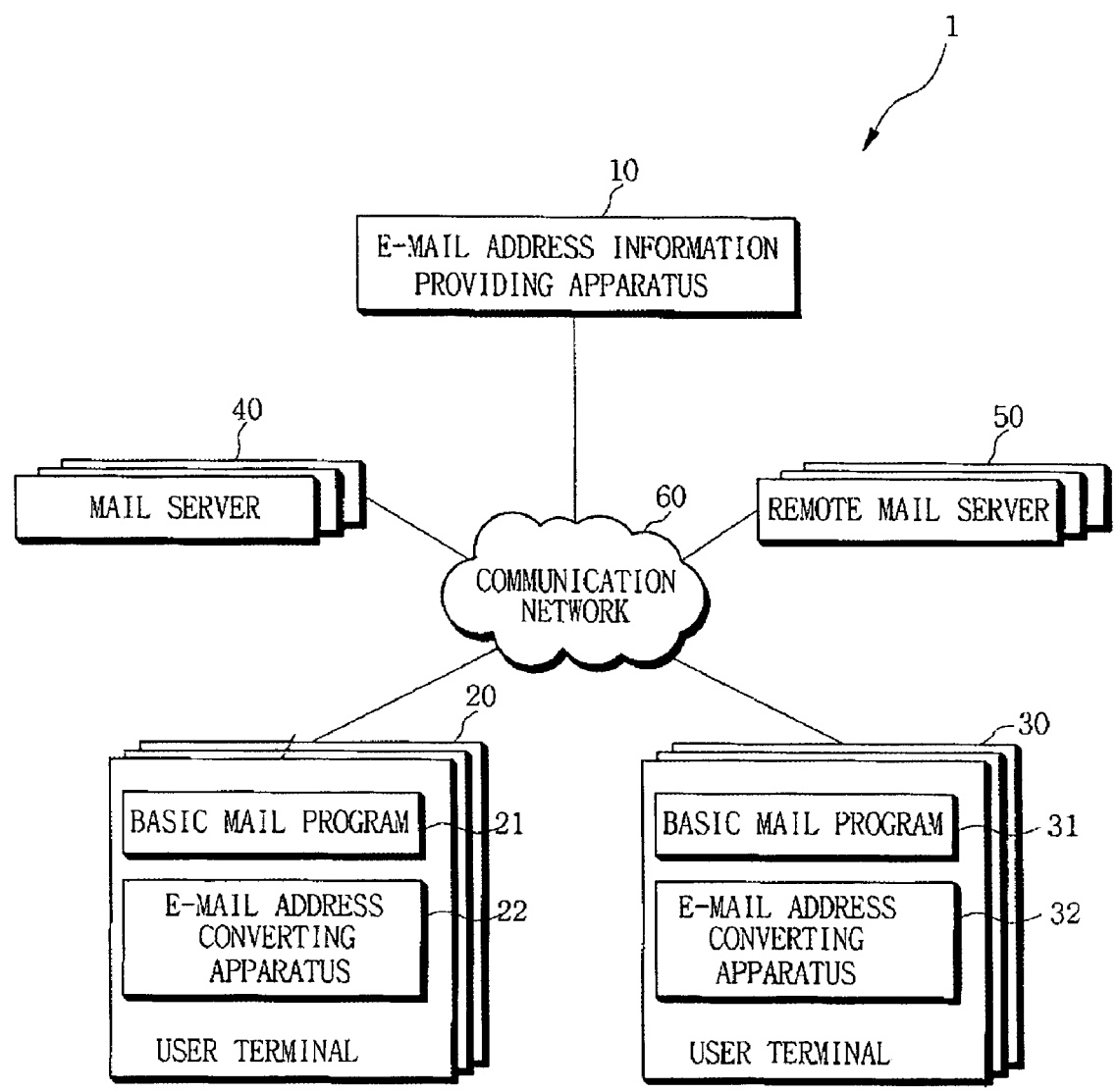
FIG. 1 illustrates a structure of a system for providing e-mail address information using a mobile phone number according to an embodiment of the present invention.

FIG. 1 illustrates a structure of a system 1 for providing e-mail address information using a mobile phone number according to an embodiment of the present invention. Referring to FIG. 1, the structure includes an e-mail address converting module interlocking with a basic e-mail program (e.g., Outlook) provided in a user terminal (e.g., a personal computer (PC)) when a user sends e-mail through the basic e-mail program and an e-mail address information providing module interlocking with the e-mail address converting module through a communication network.

The system 1 includes an e-mail address information providing module 10, user terminals (e.g., PCs) 20 and 30, e-mail servers 40, remote e-mail servers 50, and a communication network (e.g., Internet) 60.

The user terminals 20 and 30 include basic e-mail programs (e.g., Outlook) 21 and 31, respectively, supporting e-mail transmission and reception and e-mail address converting modules 22 and 32, respectively, converting a recipient's mobile phone number input as recipient information by a user creating an e-mail message into a specified e-mail address of the recipient.

An e-mail server 40 receives e-mail through the communication network 60 from the user terminals 20 and 30 (strictly, the basic e-mail programs 21 and 31 respectively included in the user terminal 20 and 30), recognizes an e-mail address of a recipient of the e-mail, and transmits the e-mail to the terminal having the recognized e-mail address. Here, the e-mail server 40 transmits the e-mail to the recipient's terminal through the communication network 60 or through an interlocking with another e-mail server (i.e., a remote e-mail server 50) through the communication network 60. Functions of the e-mail server 40 and the remote e-mail server 50 and interactions therebetween are widely known to those skilled in the art. Thus, detailed descriptions thereof will be omitted.

The e-mail address information providing module 10 provides specified e-mail address information to be mapped to a mobile phone number and interlocks with the e-mail address converting modules 22 and 32 respectively included in the user terminals 20 and 30 through the communication network 60.

Figure 1A:
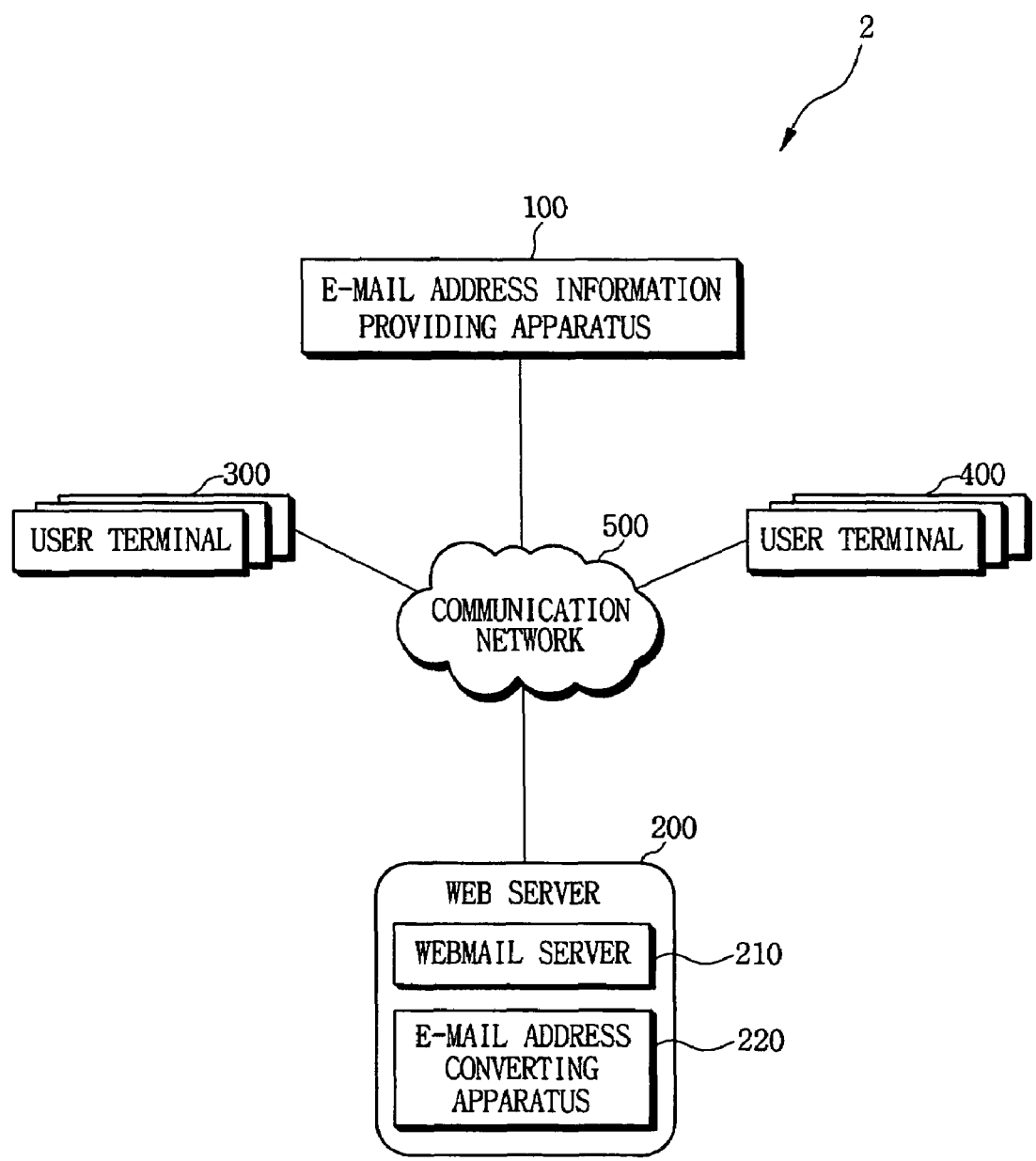
FIG. 1A illustrates a structure of a system for providing e-mail address information using a mobile phone number according to another embodiment of the present invention.

FIG. 1A illustrates a structure of a system 2 for providing e-mail address information using a mobile phone number according to another embodiment of the present invention. Referring to FIG. 1A, the structure includes an e-mail address converting module interlocking with a webmail server provided in a web server supporting web-based e-mail service (e.g., a Hotmail service of Microsoft or a Hanmail service of Daum) when a user sends e-mail through the web-based e-mail service and an e-mail address information providing module interlocking with the e-mail address converting module through a communication network.

An e-mail address information providing module 100 and an e-mail address converting module 220 according to the embodiment illustrated in FIG. 1A operate in the same manner as the e-mail address information providing module 10 and the e-mail address converting modules 22 and 32 according to the embodiment illustrated in FIG. 1. However, the e-mail address converting module 220 illustrated in FIG. 1A interlocks with a webmail server 210 of a web server 200 supporting e-mail service on a web while the e-mail address converting modules 22 and 32 illustrated in FIG. 1 respectively interlock with the basic e-mail programs 21 and 31 respectively included in the user terminals 20 and 30. Accordingly, hereinafter, the e-mail address information providing module 10 and the e-mail address converting modules 22 and 32 according to the embodiment illustrated in FIG. 1 will be described in detail.

Figure 2:
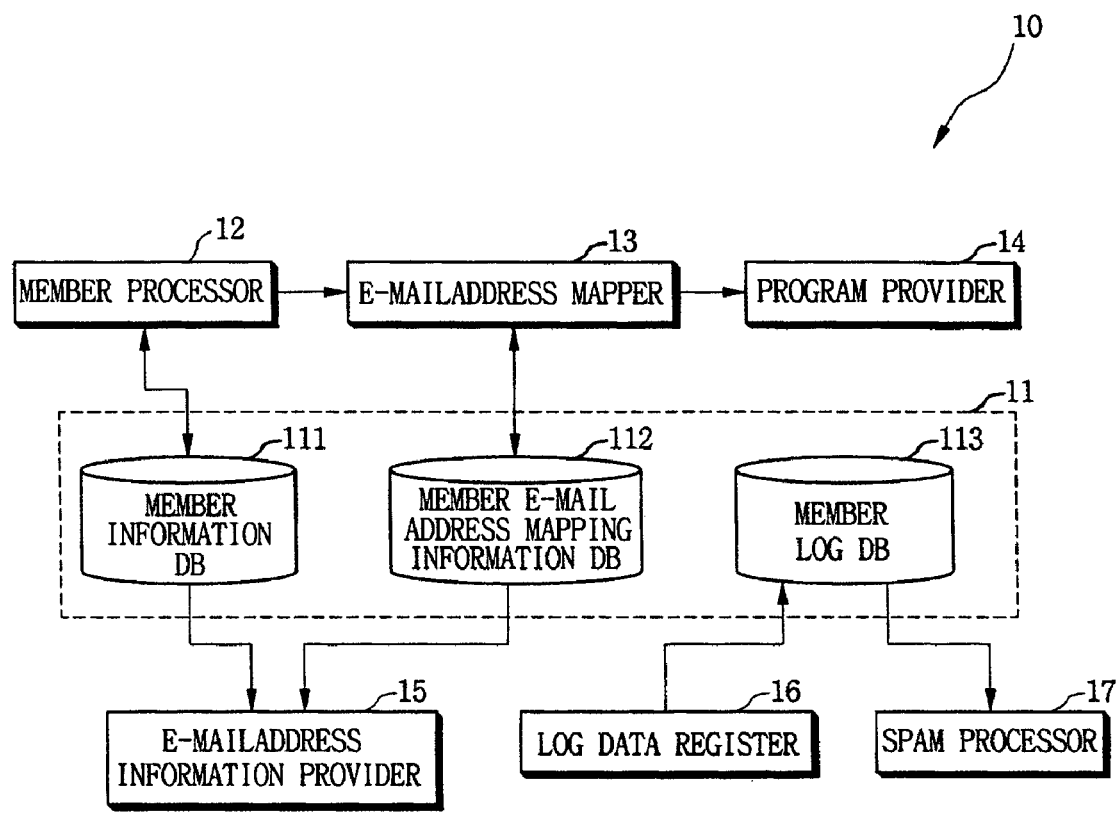
FIG. 2 is a functional block diagram of an e-mail address information providing module in a system for providing e-mail address information, according to an embodiment of the present invention.

FIG. 2 is a functional block diagram of an e-mail address information providing module 10 in a system for providing e-mail address information, according to an embodiment of the present invention. As shown in FIG. 2, the e-mail address information providing module 10 includes a database (DB) unit 11, a member processor 12, an e-mail address mapper 13, a program provider 14, an e-mail address information provider 15, a log data register 16, and a spam processor 17.

The DB unit 11 includes a member information DB 111, a member e-mail address mapping information DB 112, and a member log DB 113.

The member information DB 111 stores personal information of members registered in the e-mail address information providing module 10 supporting a service (hereinafter, referred to as an e-mail address information providing service) providing specified e-mail address information mapped to a mobile phone number so that an e-mail sender can send e-mail using the mobile phone number according to the present invention. The personal information includes an ID, a password, a name, a resident registration number, home information, office information, a mobile phone number, etc.

The member e-mail address mapping information DB 112 stores e-mail address information containing at least one e-mail address of each member and e-mail address mapping information for variably mapping at least one e-mail address of a member to a mobile phone number of the member. FIG. 3A illustrates the member e-mail address mapping information DB 112 managed by the e-mail address information providing module 10.

Referring to FIG. 3A, the member e-mail address mapping information DB 112 includes a member identification information field 1121, an e-mail address information field 1122, and an e-mail address mapping information field 1123. A member's ID and mobile phone number are recorded as information for identifying the member in the member identification information field 1121. At least one e-mail address of the member is recorded in the e-mail address information field 1122. Information for variably mapping at least one e-mail address of the member to a mobile phone number of the member is recorded in the e-mail address mapping information field 1123. For example, when a member has e-mail addresses "*@A.com", "*-*@hanmail.net", and "*77@hotmail.com" and sets an e-mail account for transmitting e-mail using the e-mail address "*@A.com" to "A.com" and "B.com", an e-mail account for transmitting e-mail using the e-mail address "*-*@hanmail.net" to "hanmail.net", an e-mail account for transmitting e-mail using the e-mail address "*77@hotmail.com" to "others", e-mail account information set by the member is recorded in the e-mail address mapping information field 1123. In addition, sequence information for sequentially mapping the member's e-mail addresses to the member's mobile phone number may be recorded in the e-mail address mapping information field 1123. Here, an example of mapping an e-mail address to a mobile phone number has been described. It is apparent that many other methods may be used to map an e-mail address to a mobile phone number in the present invention.

When a member transmits e-mail using a predetermined mobile phone number, the member log DB 113 stores log data with respect to the e-mail created by the member. FIG. 3B illustrates the member log DB 113 managed by the e-mail address information providing module 10 according to an embodiment of the present invention. Referring to FIG. 3B, the member log DB 113 includes an e-mail sender information field 1131, an e-mail recipient information field 1132, and an e-mail information field 1133. The name, mobile phone number, and e-mail address information of an e-mail sender are recorded in the e-mail sender information field 1131. Information (e.g., a mobile phone number and an e-mail address) regarding one or more e-mail recipients receiving the e-mail sent by the e-mail sender is recorded in the e-mail recipient information field 1132. The subject, content, sent and received dates (e.g., times and dates), etc. of the e-mail sent by the e-mail sender are recorded in the e-mail information field 1133.

The member processor 12 provides a registration procedure to a user that accesses the e-mail address information providing module 10 and requests member registration and stores/manages personal information input by the user registered as a member in the member information DB 111.

The e-mail address mapper 13 receives e-mail address information containing at least one e-mail address from a member, detects information (i.e., e-mail address mapping information) for variably mapping at least one e-mail address of the member to a mobile phone number of the member according to the member's request, and stores/manages the e-mail address information and the e-mail address mapping information in the member e-mail address mapping information DB 112. In addition, the e-mail address mapper 13 can change the e-mail address information or the e-mail address mapping information stored in the member e-mail address mapping information DB 112 according to the member's request.

When a member requests to download a program (i.e., an e-mail address converting module) converting a mobile phone number into predetermined e-mail address, the program provider 14 downloads the e-mail address converting module (22 or 32 shown in FIG. 1) to the member's terminal (e.g., a PC) (20 or 30 shown in FIG. 1). According to the embodiment illustrated in FIG. 1, the member sends and receives e-mail using a basic e-mail program (21 or 31) provided in the member's terminal (20 or 30). Therefore, the e-mail address converting module (22 or 32) is downloaded to the member's terminal (20 or 30) to allow the member to use e-mail address information providing service according to the present invention.

When a member (e.g., a member #1) inputs a mobile phone number as a recipient's information when creating e-mail using the basic e-mail program (e.g., 21 shown in FIG. 1) provided in the member's terminal (e.g., 20 shown in FIG. 1), the e-mail address converting module (e.g., 22 shown in FIG. 1) provided in the member's terminal 20 requests predetermined e-mail address information. Then, the e-mail address information provider 15 searches the member information DB 111 for the mobile phone number received with the request for the predetermined e-mail address information and verifies whether an e-mail recipient corresponding to the mobile phone number is a member of the e-mail address information providing service according to the present invention. Here, the e-mail address information provider 15 also receives e-mail address information and a mobile phone number of a sender (i.e., the member #1) that sends the e-mail in addition to the mobile phone number input as the recipient information.

When it is verified that the e-mail recipient corresponding to the mobile phone number is a member (e.g., a member #2), the e-mail address information provider 15 recognizes e-mail address mapping information regarding the e-mail recipient (i.e., the member #2) using the member e-mail address mapping information DB 112, extracts specified e-mail address information to be mapped to the mobile phone number of the e-mail recipient (the member #2) based on the recognized e-mail address mapping information, and transmits the specified e-mail address information to the e-mail address converting module 22. For example, when e-mail address information of the sender (the member #1) sending the e-mail to the recipient (the member #2) is "*@A.com", the e-mail address information provider 15 extracts e-mail address information "-*@D.com" of the recipient (the member #2) as the specified e-mail address information to be mapped to the mobile phone number of the recipient (the member #2), based on the e-mail address mapping information of the recipient (the member #2) stored in the member e-mail address mapping information DB 112**.

However, when it is verified that the e-mail recipient corresponding to the mobile phone number is not a member, the e-mail address information provider 15 informs the e-mail address converting module 22 that the e-mail address information is not present.

Meanwhile, when the member #1 sends the e-mail, the e-mail address converting module 22 provided in the terminal (20 shown in FIG. 1) of the member #1 requests registration of an e-mail log. Then, the log data register 16 stores/manages log data regarding the e-mail in the member log DB 113.

When the member #1 reports spam, the e-mail address converting module 22 provided in the terminal 20 requests a spam report. Then, the spam processor 17 retrieves e-mail details including information regarding every e-mail received by the member #1 from the member log DB 113 and provides the retrieve e-mail details to the member #1. FIG. 4 illustrates received e-mail details according to an embodiment of the present invention. When the member #1 selects a particular e-mail item referring to the received e-mail details and then requests a spam report with respect to the e-mail, the spam processor 17 provides a spam processing system (not shown) with information regarding a sender (e.g., the sender's mobile phone number, name, mail content, etc) that sent the e-mail reported as spam by the member #1.

Figures 5, 6:
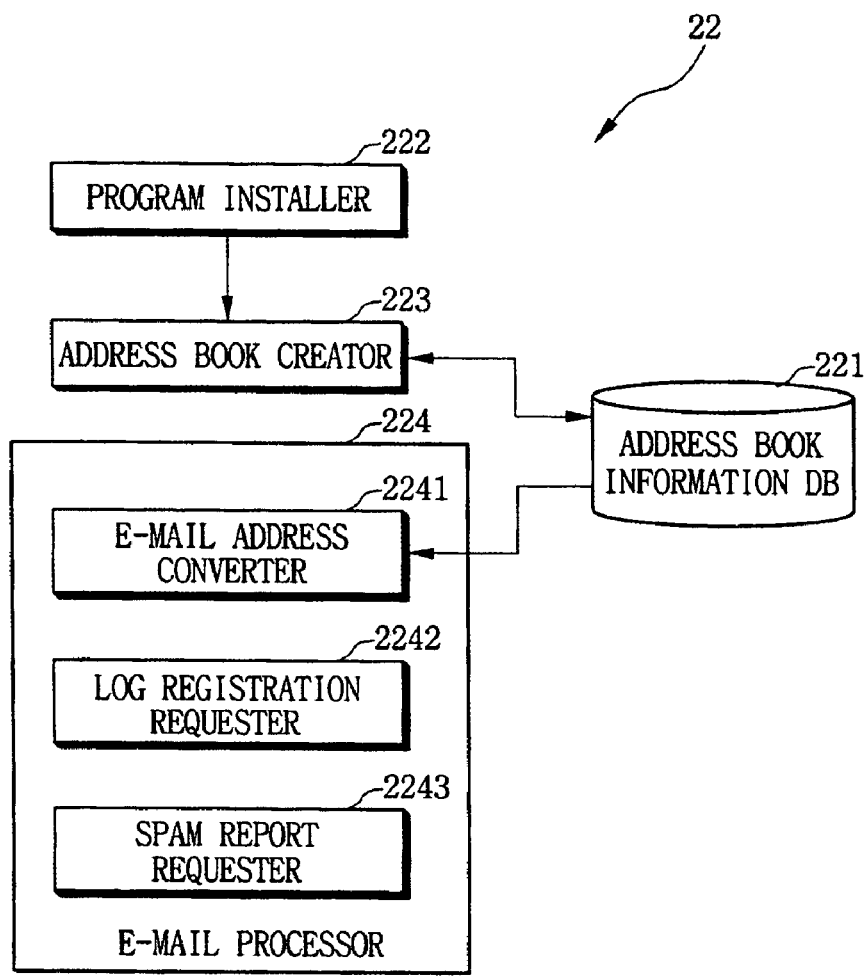
FIG. 5 is a functional block diagram of an e-mail address converting module in a system for providing e-mail address information, according to an embodiment of the present invention.
FIG. 6 illustrates a DB managed by an e-mail address converting module according to an embodiment of the present invention.

FIG. 5 is a functional block diagram of the e-mail address converting module 22 in a system for providing e-mail address information, according to an embodiment of the present invention. Referring to FIG. 5, the e-mail address converting module 22 includes an address book information DB 221, a program installer 222, an address book creator 223, and an e-mail processor 224.

The address book information DB 221 stores recipient basic information, recipient e-mail address information, and e-mail address search area information, which are input by a user (i.e., a member registered in an e-mail address information providing service according to the present invention) that sends and receives e-mail using a basic e-mail program (e.g., 21 shown in FIG. 1) provided in a user terminal (e.g., 20 shown in FIG. 1). FIG. 6 illustrates the address book information DB 221 managed by an e-mail address converting module according to an embodiment of the present invention.

Referring to FIG. 6, the address book information DB 221 includes a recipient basic information field 2211, a recipient e-mail address information field 2212, and an e-mail address search area information field 2213. An e-mail recipient's name, official title, nickname, home information, office information, and mobile phone number, etc are recorded in the recipient basic information field 2211. E-mail address information containing at least one e-mail address of the e-mail recipient is recorded in the recipient e-mail address information field 2212. Information regarding an area searched for e-mail address information corresponding to the e-mail recipient's mobile phone number is recorded in the e-mail address search area information field 2213. For example, when a user sets a recipient's e-mail address search area to the address book information DB 221 included in the e-mail address converting module 22 provided in the user's terminal, a "personal address book area" may be recorded in the e-mail address search area information field 2213. In another example, when a user sets the recipient's e-mail address search area to the member e-mail address mapping information DB 112 shown in FIG. 2 included in the e-mail address information providing module 10 shown in FIG. 2, a "common address book area" may be recorded in the e-mail address search area information field 2213. In still another example, both of the "personal address book area" and the "common address book area" may be recorded in the e-mail address search area information field 2213.

The program installer 222 installs in the user terminal 20 a program, i.e., the e-mail address converting module 22 downloaded from the e-mail address information providing module 10 according to a request of a user (e.g., the member #1) registered in the e-mail address information providing service according to the present invention. When installing the e-mail address converting module 22 in the user terminal 20, the program installer 222 transmits hardware information and software information of the user terminal 20 to the e-mail address information providing module 10 through a communication network so that the e-mail address converting module 22 can be upgraded afterwards. The transmitting of the information and other operations of the program installer 222 are sequential operations usually performed according to a program when the program is installed in a PC. Thus, detailed descriptions thereof will be omitted.

The address book creator 223 provides an environment for creating an address book according to an address book creation request of a user (e.g., the member #1), detects e-mail recipient address book information from information input by the user, and stores/manages the detected e-mail recipient address book information in the address book information DB 221. The e-mail recipient address book information includes recipient basic information, recipient e-mail address information, and e-mail address search area information. The address book information DB 221 has been described in detail with reference to FIG. 6 above.

Figure 7A:
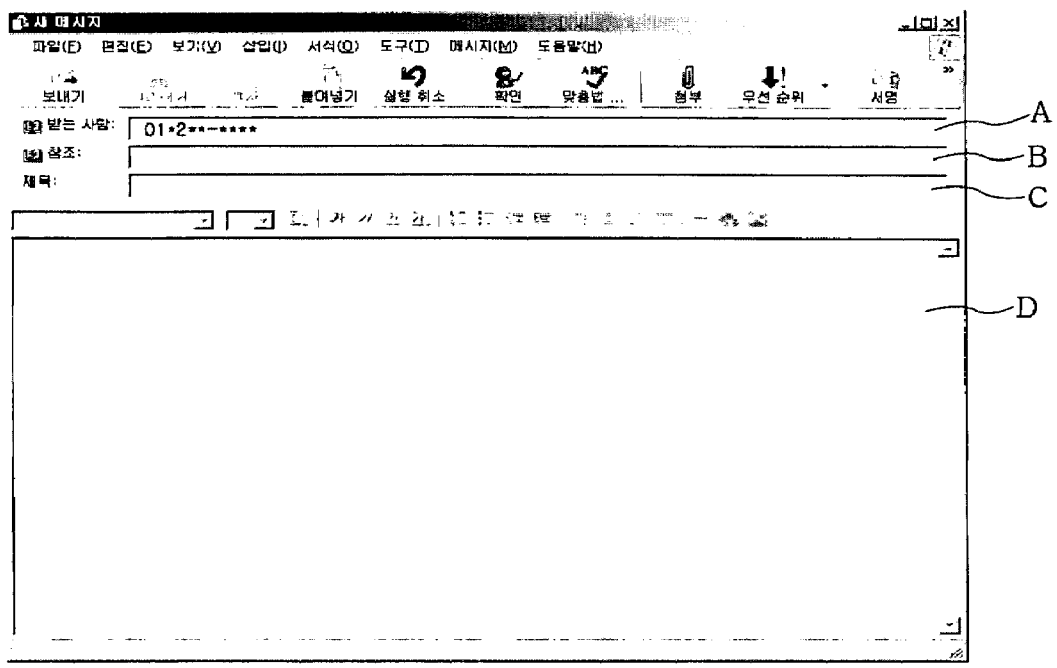
FIGS. 7A and 7B illustrate a procedure for converting a mobile phone number into e-mail address information in an e-mail address converting module, according to an embodiment of the present invention.

When it is recognized that a mobile phone number is typed in an e-mail recipient information box on the basic e-mail program 21 provided in the user terminal 20 by the user (i.e., the member #1), an e-mail address converter 2241 included in the e-mail processor 224 searches the address book information DB 221 for recipient address book information corresponding to the typed mobile phone number. Referring to FIG. 7A, to send e-mail, the user (the member #1) drives the basic e-mail program 21 provided in the user terminal 20, types a recipient's mobile phone number in a To box A, and moves to a Cc box B, a subject box C, or a message box D. Then, the e-mail address converter 2241 recognizes the mobile phone number typed in the To box A.

When the recipient address book information corresponding to the mobile phone number is retrieved from the address book information DB 221, the e-mail address converter 2241 checks the e-mail address search area information regarding the recipient. If a personal address book area is recognized as the e-mail address search area information, the e-mail address converter 2241 extracts the recipient's e-mail address information corresponding to the mobile phone number from the address book information DB 221. When the extracted e-mail address information contains a plurality of e-mail addresses, the e-mail address converter 2241 may provide a separate additional window (not shown) to the user (the member #1) to allow the user to select one e-mail address.

Alternatively, when a common address book area is recognized as the e-mail address search area information, the e-mail address converter 2241 transmits the mobile phone number typed by the user (the member #1) to the e-mail address information providing module 10 through the communication network 60 shown in FIG. 1 and requests e-mail address information to be mapped to the mobile phone number. As a result, the e-mail address converter 2241 receives specified e-mail address information to be mapped to the mobile phone number.

As another alterative, when both of the personal and common address book areas are recognized as the e-mail address search area information, the e-mail address converter 2241 performs all of the above-described operations. Consequently, the e-mail address converter 2241 may provide the e-mail address information extracted from the address book information DB 221 and the e-mail address information received from the e-mail address information providing module 10 to the user (the member #1) to allow the user to select one e-mail address.

However, when no recipient address book information corresponding to the mobile phone number is retrieved from the address book information DB 221, the e-mail address converter 2241 transmits the mobile phone number input by the user (the member #1) to the e-mail address information providing module 10 through the communication network 60 and requests e-mail address information to be mapped to the mobile phone number. As a result, the e-mail address converter 2241 receives specified e-mail address information to be mapped to the mobile phone number.

Figure 7B:
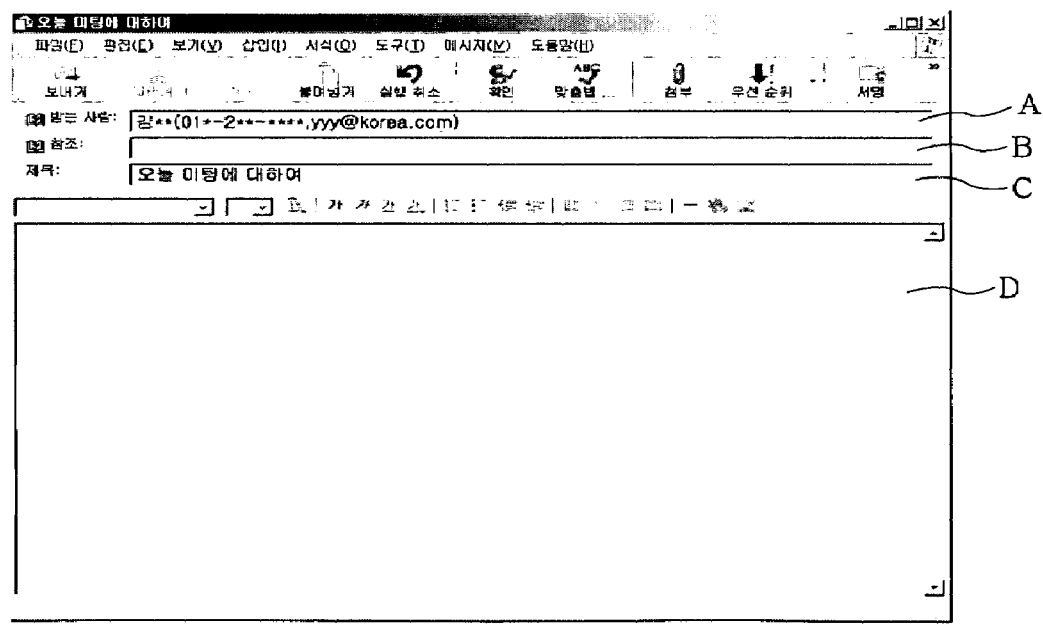

Thereafter, the e-mail address converter 2241 converts the mobile phone number input by the user (the member #1) into the specified e-mail address information acquired through the above-described operation. For example, as shown in FIG. 7B, the mobile phone number typed in the To box A shown in FIG. 7A is converted into specified e-mail address information with a format "recipient's name+mobile phone number+ e-mail address." The specified e-mail address information shown in FIG. 7B is just an example and may include only an e-mail address.

As a result of transmitting the mobile phone number input by the user (the member #1) to the e-mail address information providing module 10 through the communication network 60 and requesting e-mail address information to be mapped to eh mobile phone number, if it is informed that no e-mail address information to be mapped to the mobile phone number is present, the e-mail address converter 2241 reports non-existence of the e-mail address information to be mapped to the mobile phone number to the user using a separate additional window (not shown).

When the user (the member #1) requests to send e-mail after completing the creation of the e-mail, a log registration requester 2242 included in the e-mail processor 224 requests the e-mail address information providing module 10 to register the log of the e-mail through the communication network 60. Operations performed by the e-mail address information providing module 10 in response to an e-mail log registration request of the e-mail address converting module 22 (specifically, the log registration requester 2242 included in the e-mail address converting module 22) have been described with reference to FIG. 2 above. Transmission of the e-mail created by the user (the member #1) is a typical procedure performed by interaction among the basic e-mail program 21 provided in the user terminal 20, the e-mail server 40 shown in FIG. 1, and the remote e-mail server 50 shown in FIG. 1. Thus, detailed descriptions thereof will be omitted.

When the user (the member #1) requests a spam report while checking received e-mail, a spam report requester 2243 included in the e-mail processor 224 requests the e-mail address information providing module 10 to report the received e-mail as spam. Here, the e-mail address information providing module 10 detects and provides e-mail details containing information regarding every e-mail transmitted to the user (the member #1), as shown in FIG. 4. Then, the user (the member #1) selects an e-mail item to be reported as spam referring to the provided e-mail details and makes a spam report with respect to the selected e-mail item.

Figure 8:
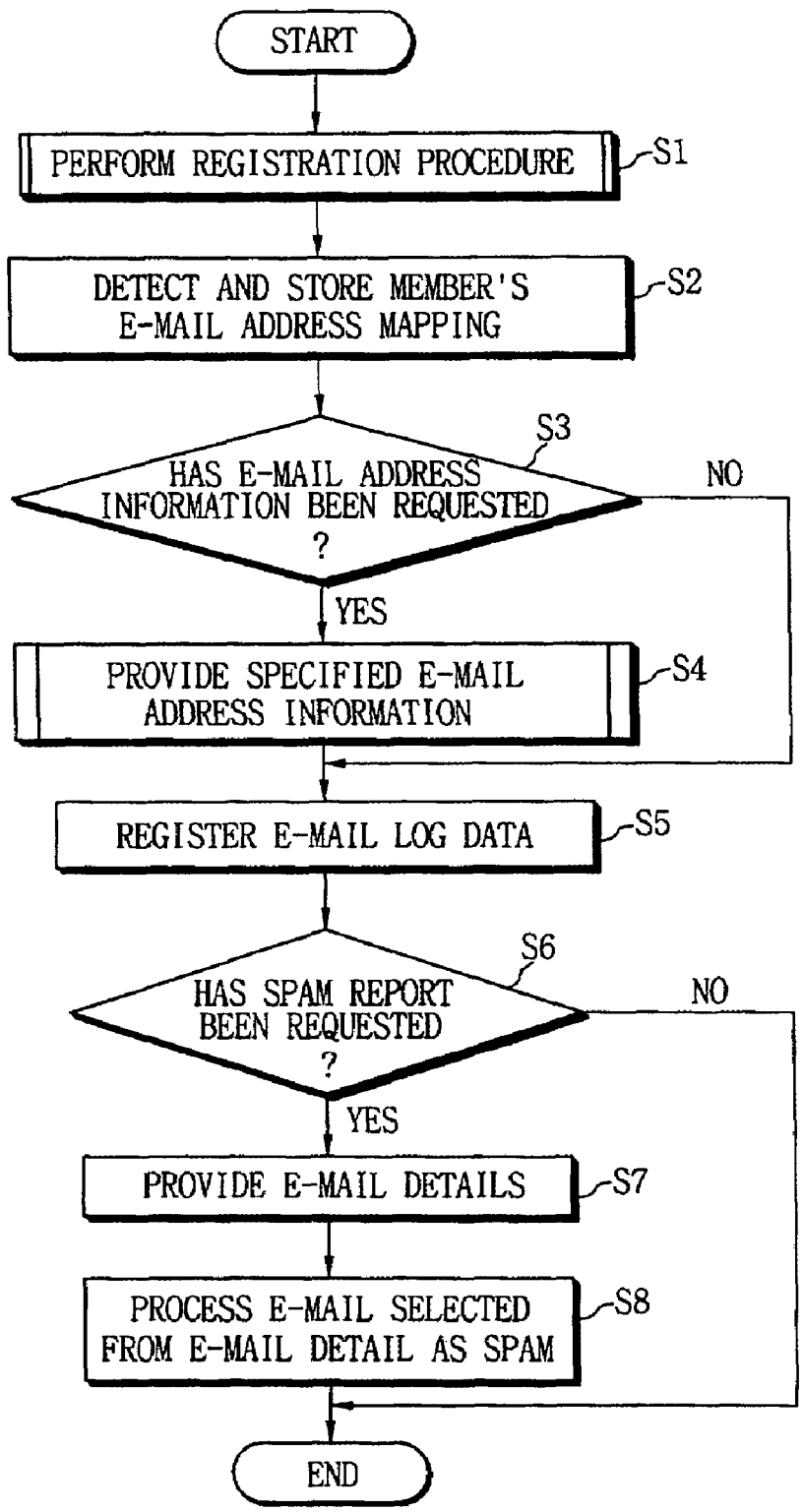
FIG. 8 is a flowchart of a method of providing e-mail address information using a mobile phone number in an e-mail address information providing module, according to an embodiment of the present invention.

FIG. 8 is a flowchart of a method of providing e-mail address information using a mobile phone number in an e-mail address information providing module, according to an embodiment of the present invention. Referring to FIG. 8, in operation S1, the e-mail address information providing module performs a registration procedure in response to a user's request for registration in an e-mail address information providing service according to the present invention.

In operation S2, the e-mail address information providing module receives e-mail address information containing at least one e-mail address of a member and detects and stores/manages information (i.e., e-mail address mapping information) for variably mapping the member's at least one address information to the member's mobile phone number in response to the member's request.

When a mobile phone number is transmitted from an external module (i.e., an e-mail address converting module) and e-mail address information to be mapped to the mobile phone number is requested in operation S3, the e-mail address information providing module verifies whether an e-mail recipient corresponding to the mobile phone number is a member of the e-mail address information providing service, and according to the result of the verification, acquires specified e-mail address information to be mapped to the mobile phone number and transmits the specified e-mail address information to the external module in operation S4.

In operation S5, when the external module requests registration of an e-mail log, the e-mail address information providing module registers log data regarding the e-mail.

When a member requests a spam report in operation S6, the e-mail address information providing module provides the member requesting the spam report with e-mail details containing information regarding every e-mail transmitted to the member in operation S7. Next, in operation S8, the e-mail address information providing module processes e-mail selected by the member from the e-mail details as spam by providing information regarding a sender of the selected e-mail (e.g., the name and mobile phone number of the sender, content of the e-mail, etc.) to a spam processing system.

Figure 8A:
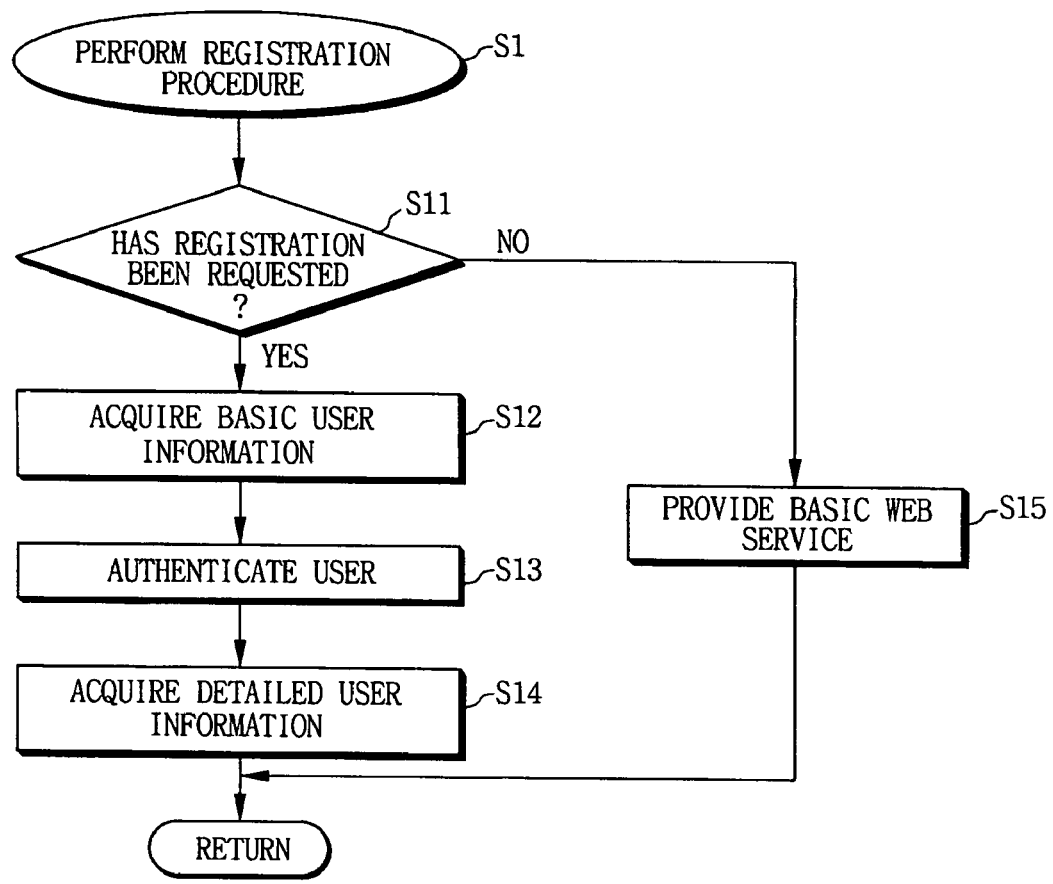
FIG. 8A is a flowchart of an operation of performing a registration procedure in an e-mail address information providing module, according to an embodiment of the present invention.

FIG. 8A is a flowchart of operation S1 in which the e-mail address information providing module performs the registration procedure according to an embodiment of the present invention. Referring to FIG. 8A, when a user makes a request for registration in the e-mail address information providing service in operation S11, the e-mail address information providing module requests the user to input basic user information (e.g., the user's ID, password, name, resident registration number, mobile phone number, etc) and receives the basic user information in operation S12.

Next, in operation S13, the e-mail address information providing module authenticates the user based on the basic user information input by the user. More specifically, to verify whether the user is identified by the basic user information (particularly, the mobile phone number) input by the user, the e-mail address information providing module transmits a short message to the user's mobile phone using the mobile phone number input by the user to request the user to input a given authentication number or a part of the user's resident registration number. Thereafter, if the user inputs the given authentication number or the part of the user's resident registration number on the user's terminal (e.g., a PC) according to the short message transmitted to the user's mobile phone, the e-mail address information providing module determines whether the given authentication number or the part of the user's resident registration number input on the user's terminal is the same as the given authentication number transmitted to the user's mobile phone or the resident registration number input as the basic user information in operation S12 and processes user authentication according to the result of the determination. Such user authentication is just an example, and the e-mail address information providing module can perform user authentication in various manners in embodiments of the present invention.

After the user is authenticated, the e-mail address information providing module requests the user to input detailed user information (e.g., the user's home information, office information, and at least one e-mail address, etc) and receives the detailed user information in operation S14.

Meanwhile, if the user does not request registration after accessing the e-mail address information providing module in operation S11, the e-mail address information providing module provides basic web service to the user in operation S15.

Figure 8B:
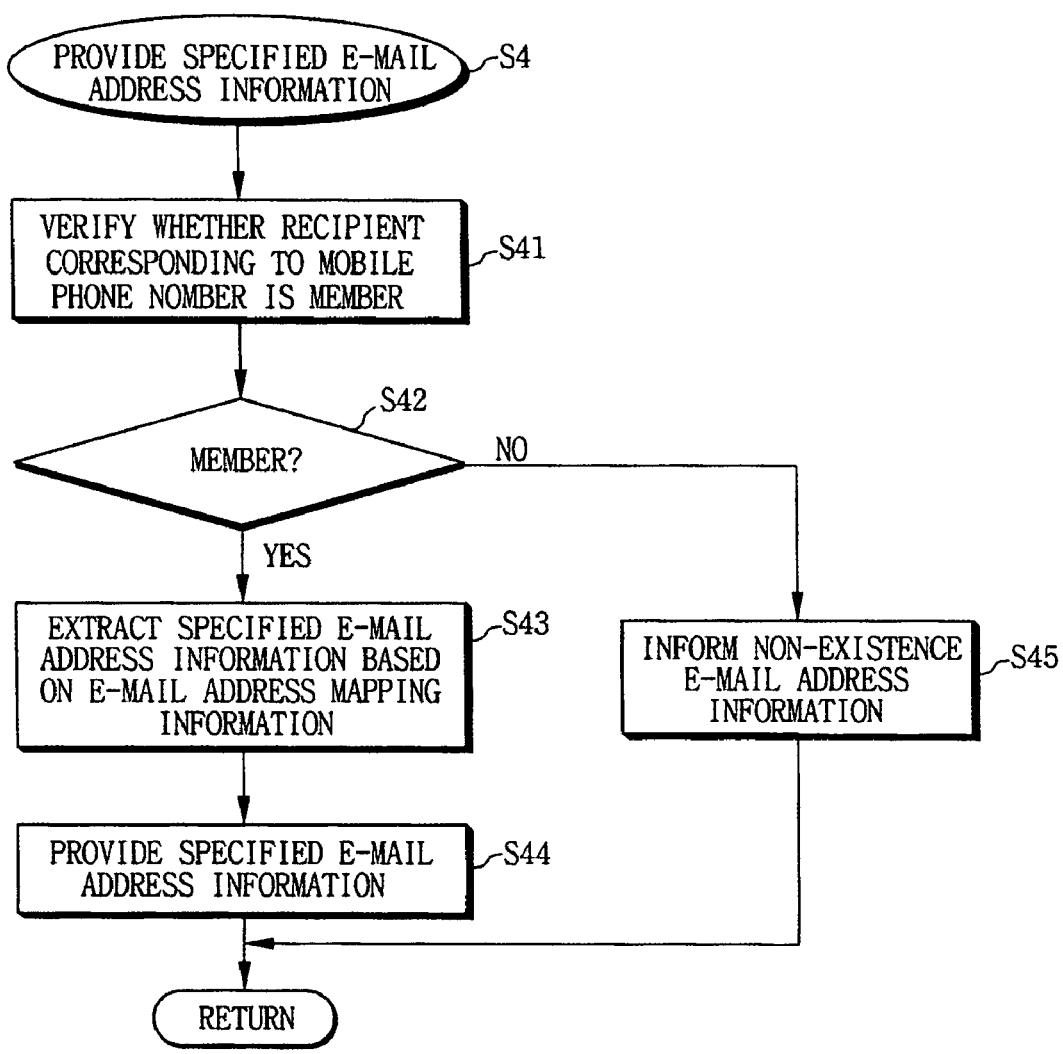
FIG. 8B is a flowchart of an operation of providing specified e-mail address information in an e-mail address information providing module, according to an embodiment of the present invention.

FIG. 8B is a flowchart of operation S4 in which the e-mail address information providing module provides the specified e-mail address information according to an embodiment of the present invention. Referring to FIG. 8B, when the mobile phone number is received from the external module, the e-mail address information providing module verifies whether the e-mail recipient corresponding to the mobile phone number is a member of the e-mail address information providing service in operation S41.

If it is determined that the recipient corresponding to the mobile phone number is the member in operation S42, the e-mail address information providing module recognizes the recipient's e-mail address mapping information and extracts specified e-mail address information to be mapped to the mobile phone number based on the e-mail address mapping information in operation S43 and transmits the specified e-mail address information in operation S44.

If it is determined that the recipient corresponding to the mobile phone number is not a member in operation S42, the e-mail address information providing module informs non-existence of the e-mail address information to be mapped to the mobile phone number in operation S45.

Figure 9:
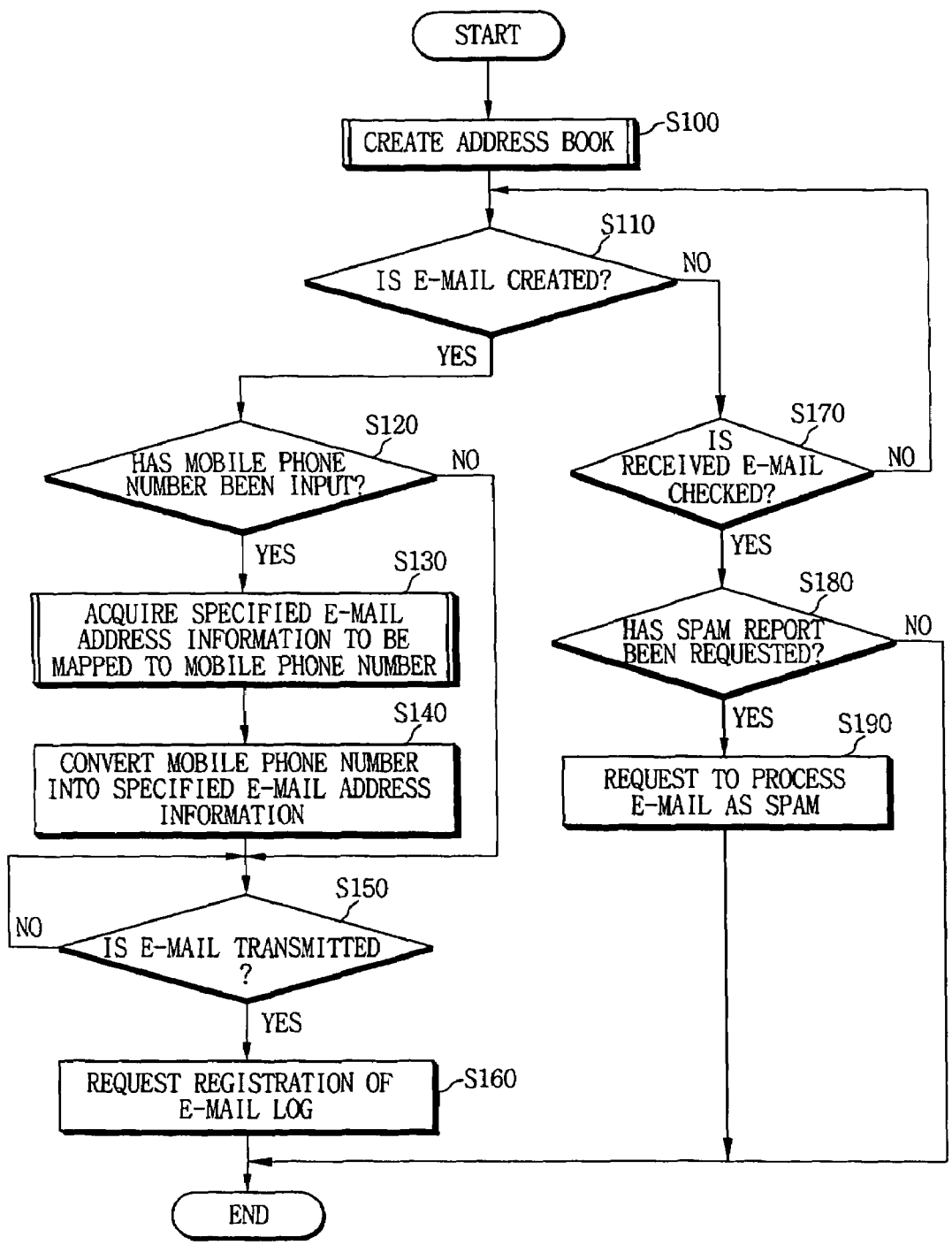
FIG. 9 is a flowchart of a method of providing e-mail address information using a mobile phone number in an e-mail address converting module, according to an embodiment of the present invention.

FIG. 9 is a flowchart of a method of providing e-mail address information using a mobile phone number in an e-mail address converting module, according to an embodiment of the present invention. Referring to FIG. 9, in operation S100, the e-mail address converting module creates an address book based on information regarding a plurality of recipients, which is input by a member (e.g., the member #1) registered in an e-mail address information providing service according to the present invention, in response to the member's request for creation of the address book. Here, when the e-mail address converting module interlocks with a basic e-mail program (e.g., Outlook) provided in a terminal (e.g., a PC) of the member, the e-mail address converting module is installed in the member's terminal through a typical procedure. The installation of the e-mail address converting module is performed by the program installer 222 included in the e-mail address converting module 22 in the manner described with reference to FIG. 5.

Thereafter, in operations S110 and S170, the e-mail address converting module observes whether the member (the member #1) wants to create e-mail or check received e-mail.

If it is observed that the member (the member #1) creates e-mail in operation S110, the e-mail address converting module determines whether a mobile phone number has been input as recipient information in operation S120.

If it is determined that the mobile phone number has been input, the e-mail address converting module acquires specified e-mail address information regarding a recipient corresponding to the mobile phone number in operation S130 and converts the mobile phone number into the specified e-mail address information in operation S140.

In addition, when the member (the member #1) requests transmission of the e-mail in operation S150, the e-mail address converting module requests an external module (i.e., an e-mail address information providing module) to register an e-mail log in operation S160.

Meanwhile, when the member (the member #1) checks the received e-mail in operation S170, the e-mail address converting module determines whether the member (the member #1) has requested a spam report in operation S180.

If it is determined that the member (the member #1) has requested the spam report, in operation S190, the e-mail address converting module accesses the external module (the e-mail address information providing module) and allows the member (the member #1) to report the received e-mail as a spam.

Figure 9A:
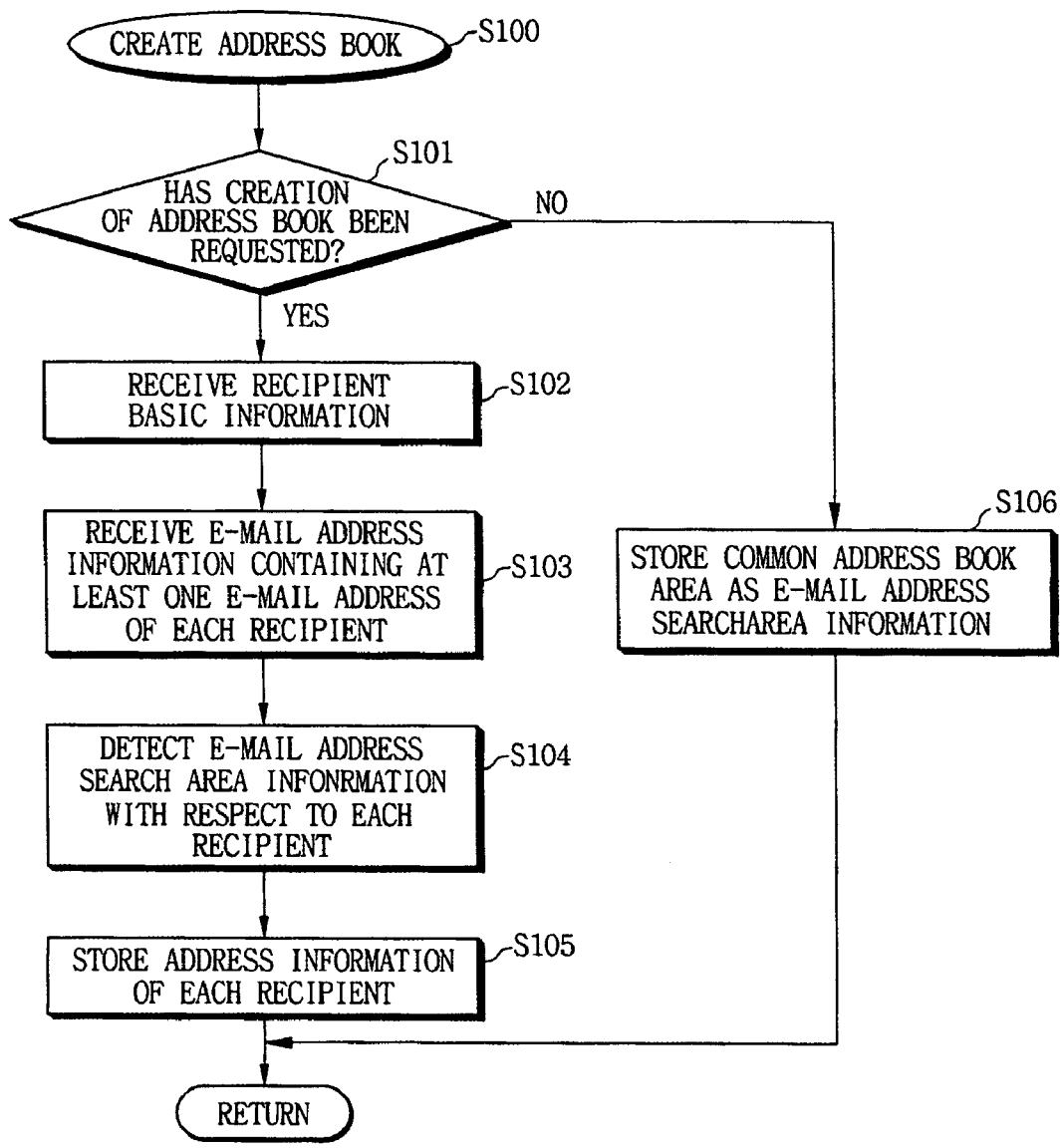
FIG. 9A is a flowchart of an operation of creating an address book in an e-mail address converting module, according to an embodiment of the present invention.

FIG. 9A is a flowchart of operation S100 in which the e-mail address converting module creates the address book according to an embodiment of the present invention. Referring to FIG. 9A, when the member (the member #1) requests creation of the address book in operation S101, the e-mail address converting module provides an environment for the creation of the address book and receives basic information regarding a plurality of recipients (e.g., each recipient's name, official title, nickname, home information, office information, mobile phone number, etc.) in operation S102 and receives e-mail address information containing at least one e-mail address of each recipient in operation S103.

In operation S104, the e-mail address converting module requests the member (the member #1) to set an area for searching e-mail address information with respect to each recipient and detects each recipient's e-mail address search area information based on the area set by the member (the member #1).

Thereafter, in operation S105, the e-mail address converting module stores each recipient's address book information containing each recipient's basic information received in operation S102, each recipient's e-mail address information received in operation S103, and each recipient's e-mail address search area information received in operation S104.

When the member (the member #1) does not request the creation of the address book in operation S101, the e-mail address converting module sets and stores a common address book area as area information (i.e., the e-mail address search area information) for searching for e-mail address information to be mapped to a mobile phone number input as recipient information by the member (the member #1) creating e-mail in operation S106.

Figure 9B:
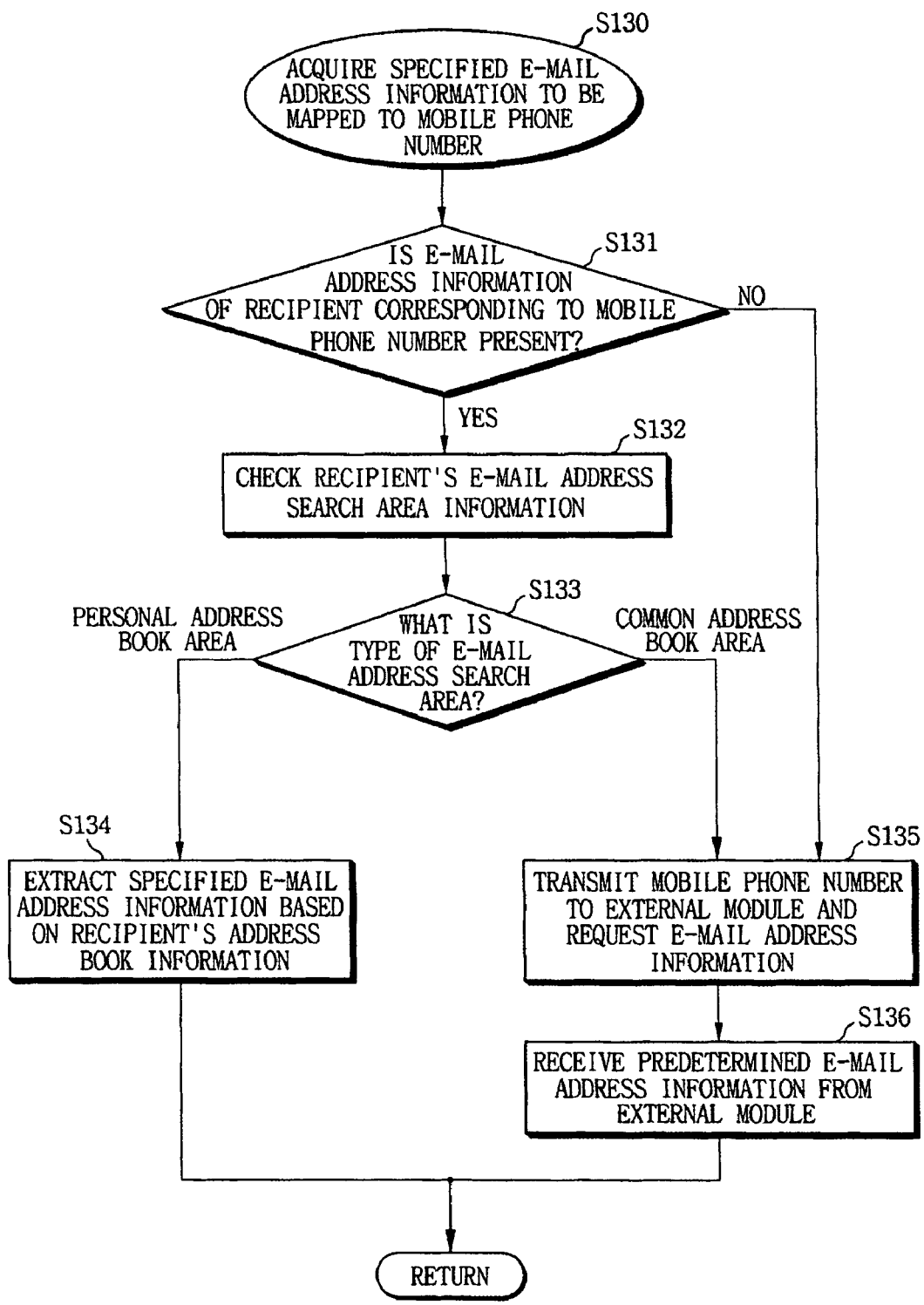
FIG. 9B is a flowchart of an operation of acquiring specified e-mail address information to be mapped to a mobile phone number in an e-mail address converting module, according to an embodiment of the present invention.

FIG. 9B is a flowchart of operation S130 in which the e-mail address converting module acquires the specified e-mail address information to be mapped to the mobile phone number according to an embodiment of the present invention. Referring to FIG. 9B, in operation S131, the e-mail address converting module determines whether address book information of the recipient corresponding to the mobile phone number input by the member (the member #1) is present.

If it is determined that the address book information corresponding to the mobile phone number is present, the e-mail address converting module checks the recipient's e-mail address search area information set by the member (the member #1) in operation S132 and recognizes a type of the recipient's e-mail address search area in operation S133.

When the recipient's e-mail address search area is recognized as a personal address book area, the e-mail address converting module extracts specified e-mail address information to be mapped to the mobile phone number based on the recipient's e-mail address information containing at least one e-mail address, which is set by the member (the member #1), in operation S134. Detailed descriptions of operation S134 have been set forth when the operations of the e-mail address converter 2241 included in the e-mail address converting module 22 were described with reference to FIG. 5 above.

When the recipient's e-mail address search area is recognized as a common address book area, the e-mail address converting module transmits the mobile phone number input by the member (the member #1) to the external module (i.e., the e-mail address information providing module) and requests e-mail address information corresponding to the mobile phone number in operation S135. In operation S136, the e-mail address converting module receives predetermined e-mail address information. Alternatively, the e-mail address converting module may acquire e-mail address information corresponding to the mobile phone number using both of the personal and common address book areas. Operations using both of the personal and common address book areas have been described when the operations of the e-mail address converter 2241 included in the e-mail address converting module 22 were described with reference to FIG. 5 above.

If it is determined that the address book information corresponding to the mobile phone number is not present, the e-mail address converting module operates in the same manner as it operates when the recipient's e-mail address search area is recognized as the common address book area to obtain the predetermined e-mail address information in operation S135 and S136.

The above description just concerns embodiments of the present invention. The present invention is not restricted to the above embodiments, and various modifications can be made thereto within the scope defined by the attached claims. For example, the shape and structure of each member specified in the embodiments can be changed.

INDUSTRIAL APPLICABILITY

According to the present, a user is enabled to send e-mail to another user, i.e., a recipient using the recipient's mobile phone number without using the recipient's e-mail address. As a result, the user is not bothered by specially managing one or more e-mail addresses of individual recipients and can send e-mail to recipients regardless of changes of the recipients' e-mail addresses.

According to the present invention, when an e-mail user registered as a member sends e-mail, e-mail log data (including e-mail sender information, e.g., a sender's name, mobile phone number, e-mail address, etc; e-mail recipient information, e.g., a recipient's name, mobile phone number, e-mail address, etc; and e-mail information, e.g., a subject, content, sent date/received date of e-mail) is registered and managed. As a result, when the e-mail is reported as spam, unique information such as the e-mail sender's name and mobile phone number are directly provided to a spam processing system, and therefore, a spam report with respect to the e-mail sender can be processed immediately.

Moreover, this immediate processing of the spam report may arouse spam senders' attention, and therefore, spam mail that is sent thoughtlessly can be reduced.

What is claimed is:

1. A system for providing e-mail address information using a mobile phone number, the system comprising:
    an e-mail address information providing service that outputs an e-mail address information including at least one e-mail address to be mapped to a mobile phone number of at least one registered member of the e-mail providing service; an e-mail address information providing module that outputs the e-mail address information of at least one registered member provided by the e-mail address information providing service corresponding to a mobile phone number as recipient information;
    an e-mail address converting module to provide the mobile phone number as recipient information to the e-mail address information providing module, receive the output e-mail address information therefrom, and convert the mobile phone number into the received e-mail address information,
    wherein the e-mail address information providing module is further configured to: recognize a registered member corresponding to the mobile phone number; receive the mobile phone number via a communication network from the e-mail address converting module; and send the output e-mail address information via a communication network to the e-mail address converting module, and wherein the e-mail address converting module is further configured to receive at least one mobile phone number as recipient information for an e-mail being sent by the registered member; and
    a first database unit that for each at least one registered member stores personal information and e-mail address information including at least one e-mail address, and e-mail address mapping information;
    the e-mail address information providing module further comprises: a member processor that performs a member registration procedure for a user with respect to the e-mail address information providing service and stores/manages the personal information of the registered member in the first database unit; and an e-mail address mapper controlled by the member processor to: (a) receive e-mail address information input by the user and detect therein e-mail address mapping information for mapping the received e-mail address information to a mobile phone number, and (b) store/manage the received e-mail address information and detected e-mail address mapping information of the member in the first database unit.

2. The system of claim 1, wherein the e-mail address information providing module further comprises an e-mail address information provider that employs the first database unit to:
    verify therein that the mobile phone number of the recipient information corresponds to a registered member; and
    extract therefrom and provide e-mail address information of the registered member to be mapped to the mobile phone number of the recipient information based on the stored e-mail address mapping information.

3. The system of claim 2, wherein the e-mail address converting module comprises:
    a second database unit that stores an address book of information for at least one recipient member, said address book information being input by a registered member of the e-mail address information providing service, said address book information comprising:
    recipient basic information,
    recipient e-mail address information including at least one e-mail address of the recipient, and
    e-mail address search area information set by the member for the recipient;
    an address book creator that provides an environment for address book creation by a registered member, extracts address book information regarding each recipient based on information input by the registered member, and stores/manages the address book information in the second database unit; and
    an e-mail address converter that when address book information regarding the recipient exists in the second database unit, obtains therefrom e-mail address information of the recipient and converts thereto the mobile phone number of the recipient according to the e-mail address mapping information of the recipient.

4. The system of claim 3, wherein the e-mail address converter if further configured to:
    when the e-mail address search area information of the recipient specifies a first search area, determine the e-mail address information to be mapped to the mobile phone number based on the address book information, and
    when the e-mail address search area information of the recipient specifies a second search area, transmit the mobile phone number as recipient information to the e-mail address information providing module via the communication network and receive e-mail address information to be mapped to the mobile phone number therefrom.

5. The system of claim 4, wherein:
    the first search area is a personal address book area of a registered member that defines an address book information regarding the recipient; and
    the second search area is a common address book shared by all registered members.

6. The system of claim 3, wherein when an address book information regarding the recipient does not exist, the e-mail address converter transmits the mobile phone number as recipient information to the e-mail address information providing module via the communication network and receives therefrom e-mail address information to be mapped to the mobile phone number.

7. The system of claim 3, wherein the e-mail address converting module further comprises:
a log registration requester that requests the e-mail address information providing module to register an e-mail log via the communication network when a registered member requests transmission of e-mail; and
a spam report requester that receives a spam report request from a member and requests the e-mail address information providing module to make a spam report.

8. The system of claim 7, wherein the e-mail address information providing module further comprises:
a log data register that:
registers e-mail log data in a log database when a member sends/receives e-mail, and
manages the e-mail log data; and
a spam processor that:
receives a spam report request from the e-mail address converting module via the communication network,
extracts from the log database details of e-mail received by the registered member requesting the spam report,
provides the e-mail details to the member, and
transmits information regarding a sender of e-mail selected as spam by the registered member to an external system.

9. The system of claim 8, wherein the e-mail address converting module is provided in a terminal of the registered member and interfaces with a basic e-mail program provided in the member's terminal.

10. The system of claim 8, wherein the e-mail address converting module is provided in a web server that provides web-based e-mail service and interfaces with a web mail server provided in the web server.

11. The system of claim 3, wherein the e-mail address converting module is provided in a terminal of the registered member and interfaces with a basic e-mail program provided in the member's terminal.

12. The system of claim 3, wherein the e-mail address converting module is provided in a web server that provides web-based e-mail service and interfaces with a web mail server provided in the web server.

13. A method of providing e-mail address information using a mobile phone number, comprising the steps of:
using at least one mobile phone number as recipient information in an e-mail by a registered member of an e-mail address information providing service;
converting the at least one mobile phone number into e-mail address information of a registered member of the e-mail address information providing service;
registering a user as a member of the e-mail address information providing service by performing the step of: receiving e-mail address information input by the user and detecting therein e-mail address mapping information for mapping the received e-mail address information to a mobile phone number, and storing/managing the received e-mail address information and detected e-mail address mapping information of the member in the first database unit,
wherein the converting step further comprises the steps of:
verifying that each at least one mobile phone number of the recipient information corresponds to a registered member; and for each verified at least one mobile phone number, extracting from the first database unit and providing e-mail address information of the registered member to be mapped to the mobile phone number based on the stored e-mail address mapping information;
in a second database unit, storing/managing an address book of information for at least one recipient registered member, said address book information being input by a registered member of the e-mail address information providing service, said address book information comprising: recipient basic information, recipient e-mail address information including at least one e-mail address of the recipient and e-mail address mapping information of the recipient, and e-mail address search area information set by the member for the recipient; when address book information regarding the recipient exists in the second database unit, the converting step further comprises the steps of:(i) obtaining from the address book, e-mail address information of the recipient, and (ii) mapping the mobile phone number of the recipient according to the e-mail address mapping information of the recipient.

14. The method of claim 13, wherein the converting step further comprises the step of when the e-mail address search area information of the recipient specifies a first search area, determining the e-mail address information to be mapped to the mobile phone number based on the address book information.

15. The method of claim 14, wherein
the first search area is a personal address book area of a registered member that defines an address book information regarding the recipient; and
the converting step further comprising the step of when the e-mail address search area information of the recipient specifies a second search area, determining the e-mail address information to be mapped to the mobile phone number based on a common address book shared by all registered members.

16. The method of claim 15, further comprising:
when a registered member requests transmission and logging of e-mail, registering log data regarding the e-mail in a log database unit;
when a spam report is requested for a received e-mail by a registered member performing the steps of:
extracting details of the received e-mail based on e-mail log data registered in the log database unit, and
reporting information regarding a sender of the e-mail to an external system.

* * * * *

UNITED STATES PATENT AND TRADEMARK OFFICE
CERTIFICATE OF CORRECTION

PATENT NO.       : 7,640,011 B2                                   Page 1 of 1
APPLICATION NO.  : 11/328971
DATED            : December 29, 2009
INVENTOR(S)      : Kwang Min Lee It is certified that error appears in the above-identified patent and that said Letters Patent is hereby corrected as shown below:

Title Page, after item 65, should read as follows:

RELATED U.S. APPLICATION DATA
-- Continuation of international application PCT/KR2004/002452 filed on September 23, 2004, which in turn claims a priority to a Korean Patent Application 2003-66870 filed on September 26, 2003. --

Signed and Sealed this

Sixth Day of July, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,640,011 B2 | Page 1 of 1 |
| APPLICATION NO. | : 11/328971 | |
| DATED | : December 29, 2009 | |
| INVENTOR(S) | : Kwang Min Lee | |

It is certified that error appears in the above-identified patent and that said Letters Patent is hereby corrected as shown below:

Column 1, beginning with line 5, should read as follows:

-- The present application is a Continuation of international application PCT/KR2004/002452 filed on September 23, 2004, which in turn claims a priority to a Korean Patent Application 2003-66870 filed on September 26, 2003. --

Signed and Sealed this

Twenty-third Day of November, 2010

David J. Kappos
*Director of the United States Patent and Trademark Office*